US009021891B2

(12) United States Patent
Gossner

(10) Patent No.: US 9,021,891 B2
(45) Date of Patent: May 5, 2015

(54) VORTEX FLOW METER HAVING A MAGNETIC FIELD GENERATING DEVICE INCLUDING A FIRST AND A SECOND EXCITATION COIL

(75) Inventor: Kai Gossner, Neukirchen-Vluyn (DE)

(73) Assignee: KROHNE Messtechnik GmbH, Duisburg (DE)

( * ) Notice: Subject to any disclaimer, the term of this patent is extended or adjusted under 35 U.S.C. 154(b) by 426 days.

(21) Appl. No.: 13/428,509

(22) Filed: Mar. 23, 2012

(65) Prior Publication Data

US 2013/0139611 A1    Jun. 6, 2013

(30) Foreign Application Priority Data

Dec. 2, 2011 (DE) .......................... 10 2011 119 981

(51) Int. Cl.
*G01F 1/32* (2006.01)
(52) U.S. Cl.
CPC ............ *G01F 1/3263* (2013.01); *G01F 1/3209* (2013.01)
(58) Field of Classification Search
None
See application file for complete search history.

(56) References Cited

U.S. PATENT DOCUMENTS

| 3,116,639 | A | * | 1/1964 | Bird | 73/861.24 |
|---|---|---|---|---|---|
| 3,419,795 | A | * | 12/1968 | Genthe et al. | 324/306 |
| 3,527,095 | A | * | 9/1970 | Wada | 73/861.12 |
| 3,573,693 | A | | 4/1971 | Chass | |
| 3,610,040 | A | * | 10/1971 | Wada | 73/861.12 |
| 3,683,691 | A | | 8/1972 | Kivenson | |
| 3,698,245 | A | | 10/1972 | McNabb | |
| 3,796,095 | A | * | 3/1974 | Fussell, Jr. | 73/861.24 |
| 3,839,913 | A | * | 10/1974 | Asado | 73/861.12 |
| 3,878,715 | A | * | 4/1975 | Kobayashi | 73/861.22 |
| 3,878,716 | A | * | 4/1975 | Asada | 73/861.24 |
| 4,005,604 | A | | 2/1977 | Herzl | |
| 4,161,878 | A | * | 7/1979 | Fussell, Jr. | 73/861.24 |
| 4,181,020 | A | | 1/1980 | Herzl | |
| 4,499,754 | A | * | 2/1985 | Akano et al. | 73/861.12 |
| 4,592,240 | A | | 6/1986 | McHale et al. | |
| 4,622,202 | A | * | 11/1986 | Yamada et al. | 376/246 |
| 5,926,020 | A | * | 7/1999 | Samson | 324/238 |
| 6,047,602 | A | * | 4/2000 | Lynnworth | 73/632 |

(Continued)

FOREIGN PATENT DOCUMENTS

| DE | 1 147 874 B | 4/1963 |
|---|---|---|
| DE | 31 27 164 A1 | 4/1982 |

(Continued)

*Primary Examiner* — Harshad R Patel
(74) *Attorney, Agent, or Firm* — Roberts Mlotkowski Safran & Cole, P.C.; David S. Safran

(57) ABSTRACT

A vortex flow meter having a measurement tube through which a medium can flow, an obstacle provided in the measurement tube for generating vortices in the medium, and a deflection body located in the region of action of the obstacle and which is deflectable by pressure variations associated with the vortices in the medium. The vortex flow meter without cabled connection between the medium-filled space in the measurement tube and the medium-free space outside the measurement tube is produced by at least one magnetic field generating device being arranged outside of the measurement tube for generating a magnetic field near the deflection body, by the deflection body having a different magnetic permeability from the medium and influencing the magnetic field, and by at least one magnetic field registering device for registering the magnetic field in the region of the deflection body being arranged outside the measurement tube.

3 Claims, 4 Drawing Sheets

(56) References Cited

U.S. PATENT DOCUMENTS

| | | |
|---|---|---|
| 7,628,080 B1 * | 12/2009 | Feller .................. 73/861.12 |
| 8,334,689 B2 | 12/2012 | Feucht et al. |
| 2003/0230150 A1 * | 12/2003 | Drahm et al. ............ 73/861.32 |
| 2006/0185442 A1 * | 8/2006 | Keese et al. ............. 73/861.12 |
| 2009/0229783 A1 * | 9/2009 | Kolesnichenko et al. .... 164/468 |
| 2009/0326839 A1 * | 12/2009 | Rogers et al. ............... 702/47 |

FOREIGN PATENT DOCUMENTS

| | | |
|---|---|---|
| DE | 33 41 661 A1 | 8/1984 |
| DE | 38 18 417 A1 | 12/1989 |
| EP | 0 249 387 A1 | 12/1987 |
| EP | 248644 A2 * | 12/1987 |
| GB | 2080632 A * | 2/1982 |
| WO | 2011/161289 A1 | 12/2011 |

* cited by examiner

VORTEX FLOW METER HAVING A MAGNETIC FIELD GENERATING DEVICE INCLUDING A FIRST AND A SECOND EXCITATION COIL

BACKGROUND OF THE INVENTION

1. Field of the Invention

The invention relates to a vortex flow meter comprising a measurement tube through which a medium can flow, an obstacle provided in the measurement tube for generating vortices in the medium and a deflection body which is provided in the region of action of the obstacle and can be deflected by the pressure variations associated with the vortices in the medium.

2. Description of Related Art

Vortex flow meters have been known for a long time, the measurement principle being based on the fact that a vortex street can form in a liquid or gaseous medium behind an obstacle around which the medium flows, this vortex street being formed by vortices shed from the obstacle and progressing with the flow. The frequency with which vortices are shed from the obstacle depends on the flow rate; with certain assumptions, this relationship is almost linear. In any event, measurement of the vortex frequency constitutes a suitable means for determining the flow rate of the medium, for which reason determination of the volume and mass throughput is possible indirectly—additionally taking into account, e.g., pressure and temperature—through the vortex frequency measurement. The vortices of the medium, which occur in a vortex street, lead to local pressure variations which act on the deflection body and are detected by it. The deflection body may be a pressure transducer, which is produced for example, using piezo elements or capacitive pressure sensors in which, albeit to a small extent, a sensor element experiences a deflection.

What is important is merely that the deflection body is arranged in the vortex street so that the vortices generated by the obstacle pass—at least indirectly—past the deflection body and are therefore detectable. To this end, the deflection body may be provided downstream behind the obstacle, in which case the obstacle and the deflection body are in fact produced physically separately. The deflection body may, however, also be the obstacle itself or be formed in the obstacle, for example, when, in the solution known from the prior art with pressure transducers, the pressure transducers are arranged over or in the obstacle and the pressure variations in the vortex street are thereby registered indirectly via channels; in this case, at least, the obstacle and the deflection body are produced physically in one unit.

In the methods known from the prior art for registering the movement of the deflection body, in which capacitive or inductive effects are used and in which operation is carried out with piezoceramics or in which optical fibers are also used to register the deflection, the deflection bodies must, respectively, be contacted by electrical or optical lines, these lines needing to be fed out of the medium-filled space through the measurement tube wall, or the housing of the vortex flow meter, into a medium-free space, usually to evaluation electronics. These feed-throughs have to be produced with very elaborate seals since—depending on the application—high pressure and/or temperature stability has to be achieved (several hundreds of bars or several hundreds of ° C.).

SUMMARY OF THE INVENTION

Therefore, it is an object of the present invention to provide a vortex flow meter in which a deflection of the deflection body can be registered without the deflection body having to be contacted via electrical and/or optical leads for this purpose, and therefore, in which there is no need to produce an elaborate measurement tube and/or housing feed-throughs.

The object derived and presented above is firstly achieved in the vortex flow meter, on which the present invention is based, in that at least one magnetic field generating device arranged outside the measurement tube generates a magnetic field in the region of the deflection body, in that the deflection body has a different magnetic permeability from the medium and influences the magnetic field, and in that at least one magnetic field registering device for registering the magnetic field in the region of the deflection body is arranged outside the measurement tube. Owing to the inventive design of the vortex flow meter, cabled access to the medium space of the vortex flow meter is no longer necessary.

What is important in the vortex flow meter according to the invention is merely that the magnetic field generating device arranged outside the measurement tube generates a magnetic field which also extends at least to the region of the deflection body, so that movement of the deflection body influences the magnetic field. Such an influence on the magnetic field is perceptible not only locally in the region of the deflection body, but also outside the measurement tube, and can be registered there by a magnetic field registering device arranged outside the measurement tube, and then evaluated. The measurement tube must not be configured so that it constitutes magnetic screening; it preferably is made of a material with a relative permeability of close to 1.

According to a preferred configuration of the invention, the magnetic field generating device comprises at least a first excitation coil enclosing the circumference of the measurement tube, so that the first excitation coil generates a magnetic field oriented in the axial extent of the measurement tube when a current is applied to it. The turns of the first excitation coil may be applied directly onto the measurement tube, although the turns may, for example, also be provided—for example, encapsulated—in a separate tubular wall, in which case, this tube, comprising the first excitation coil, may then be fitted over the measurement tube.

According to another preferred embodiment, the magnetic field generating device additionally comprises a second excitation coil enclosing the circumference of the measurement tube next to the first excitation coil, the second excitation coil also generating a magnetic field oriented in the axial extent of the measurement tube when a current is applied to it. In particular, the first excitation coil and the second excitation coil are then arranged next to one another without overlap on the measurement tube. The deflection body inside the magnetic field, and the first excitation coil and/or the second excitation coil, are respectively arranged with respect to one another so that as great as possible an influence on the magnetic field formed by the magnetic field generating device can be exerted by the deflection body.

For the basic functionality of the vortex flow meter according to the invention, of course, it is not important whether the magnetic field formed by the magnetic field generating device extends exactly in the axial extent direction of the measurement tube; other orientations of the magnetic field are also possible so long as the magnetic field formed by the magnetic field generating device can be influenced by the deflection body.

In another preferred exemplary embodiment, therefore, the magnetic field generating device comprises at least a first excitation coil, the first excitation coil generating a magnetic field oriented perpendicularly to the axial extent of the measurement tube when a current is applied to it. If the deflection body is deflected owing to the pressure variations essentially perpendicularly to the flow direction of the medium, and therefore perpendicularly to the axial direction of the measurement tube, the deflection body moves essentially in the direction of the generated magnetic field. If this takes place in the inhomogeneous part of the magnetic field, then the energy content of the arrangement, which in principle can be registered by metrology, is changed by the movement of the deflection body in the magnetic field. In this solution, in particular, the magnetic field generating device also additionally comprises a second excitation coil, the second excitation coil likewise generating a magnetic field oriented in the axial extent of the measurement tube when a current is applied to it. The first excitation coil and the second excitation coil could then, for example, be formed at opposite positions on the circumference of the measurement tube, and in particular by loop structures bearing on the circumference of the measurement tube.

In the case in which the magnetic field generating device comprises both a first excitation coil and a second excitation coil, which are arranged next to one another, a magnetic field particularly suitable for detecting a deflection of the deflection body can be generated if the first excitation coil and the second excitation coil generate magnetic fields directed opposite to one another when a current is applied to them, in particular the deflection means then being arranged in an essentially field-free region between the first excitation coil and the second excitation coil. It is readily apparent that oppositely directed magnetic fields of the first excitation coil and the second excitation coil will attenuate one another, and will in particular attenuate one another in the region in which the coils are directly next to one another. The coils, or the energizing of the coils, may be configured so that the magnetic field strength in the region of the deflection body becomes approximately or exactly zero. This sensitive equilibrium is perturbed when the deflection body moves; this perturbation can in turn be detected and the deflection of the deflection body can therefore also be registered.

In a preferred configuration of the invention, the mutually opposite magnetic fields of the first excitation coil and the second excitation coil can be generated in a particularly straightforward way if the first excitation coil and the second excitation coil are electrically connected to one another and have different winding directions, the first excitation coil and the second excitation coil preferably having an equal number of turns so that the first excitation coil and the second excitation coil also respectively form equal magnetic field strengths owing to the forced equal energizing.

There are various possibilities for configuring the magnetic field registering device for registering the magnetic field, and in principle any magnetic field sensors may be envisaged so long as their sensitivity is sufficient. Preferably, the magnetic field registering device comprises at least a first detector coil, which is arranged so that the part of the magnetic field influenced by the deflection device passes at least partially through the first detector coil. This first detector coil may be a coil different from the first and/or second excitation coil, although it may also be the first excitation coil and/or the second excitation coil. If, for example, a defined current or current profile is imposed on the first excitation coil, then a change in the magnetic field or the magnetic flux through the deflection body would lead to a change of the terminal voltage in the first excitation coil and/or the second excitation coil, the movement of the deflection body being detectable by evaluating this terminal voltage.

According to an advantageous refinement of the vortex flow meter according to the invention, however, the first detector coil is configured as a separate coil and arranged concentrically around or in the first excitation coil and/or around or in the second excitation coil. Here as well, assuming suitable electrical insulation, it is again possible to wind the detector coil directly on or under the first excitation coil and/or the second excitation coil, although it is also conceivable to provide the first detector coil in its own tubular wall.

Corresponding to the use of a first excitation coil and a second excitation coil in the magnetic field generating device, in another advantageous configuration, the magnetic field registering device comprises a further second detector coil, the first detector coil and the second detector coil being arranged coaxially and axially next to the first excitation coil and/or the second excitation coil.

Preferably, in order to generate the magnetic field, an excitation device is provided which, in a refinement of the invention, applies a sinusoidal current of constant frequency and constant amplitude to the first excitation coil and/or the second excitation coil, the frequency used preferably lying on the far side of the frequency range of the vortex frequencies to be expected, the frequency of the sinusoidal current preferably being at least a power of ten, preferably, however, more than two powers of ten, greater than the highest vortex frequency to be expected in the medium.

In detail, there are a multiplicity of possibilities for configuring and refining the vortex flow meter according to the invention. In this regard, reference is made to the following detailed description of exemplary embodiments in conjunction with the accompanying drawings.

DETAILED DESCRIPTION OF THE INVENTION

Figure 1:
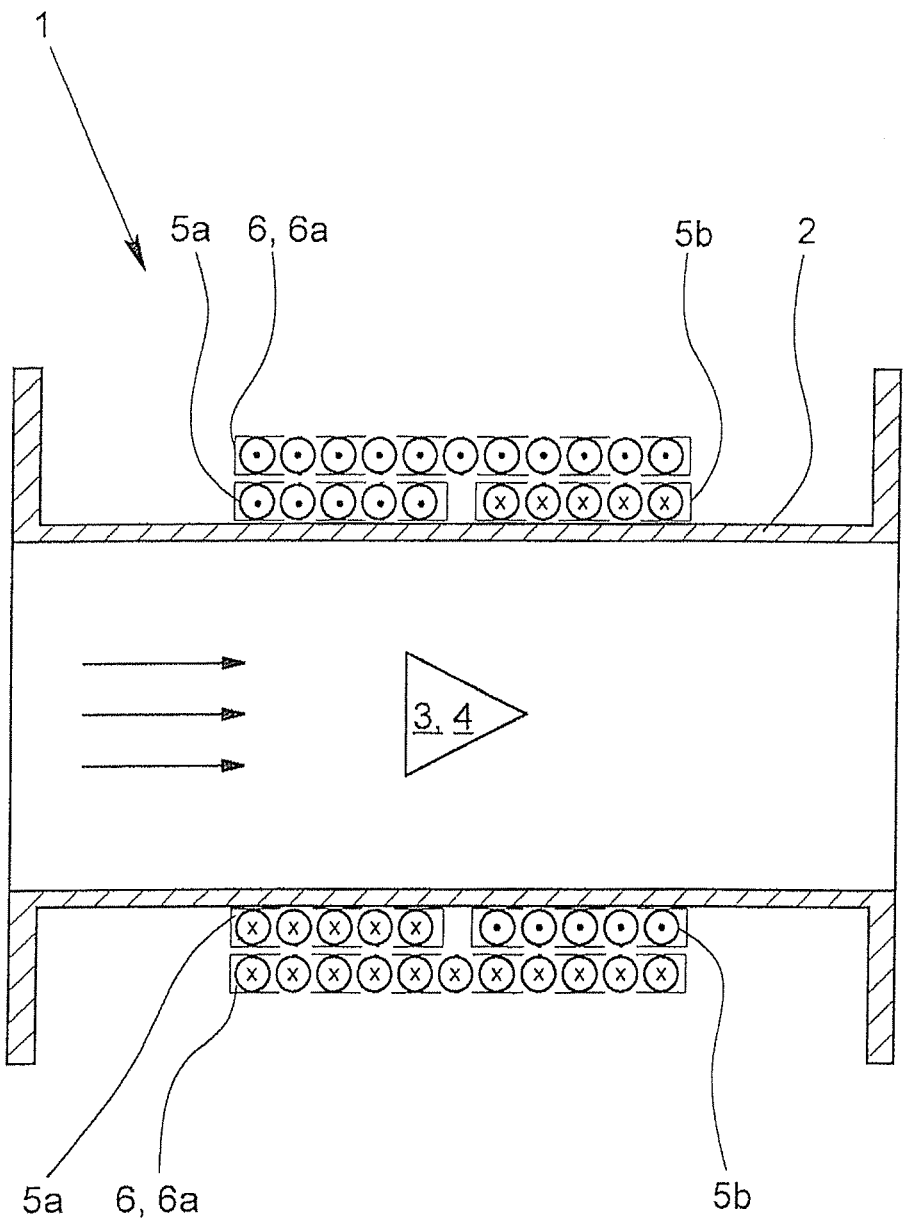
FIG. 1 is a schematic sectional representation of a vortex flow meter according to the invention.
Figure 5:
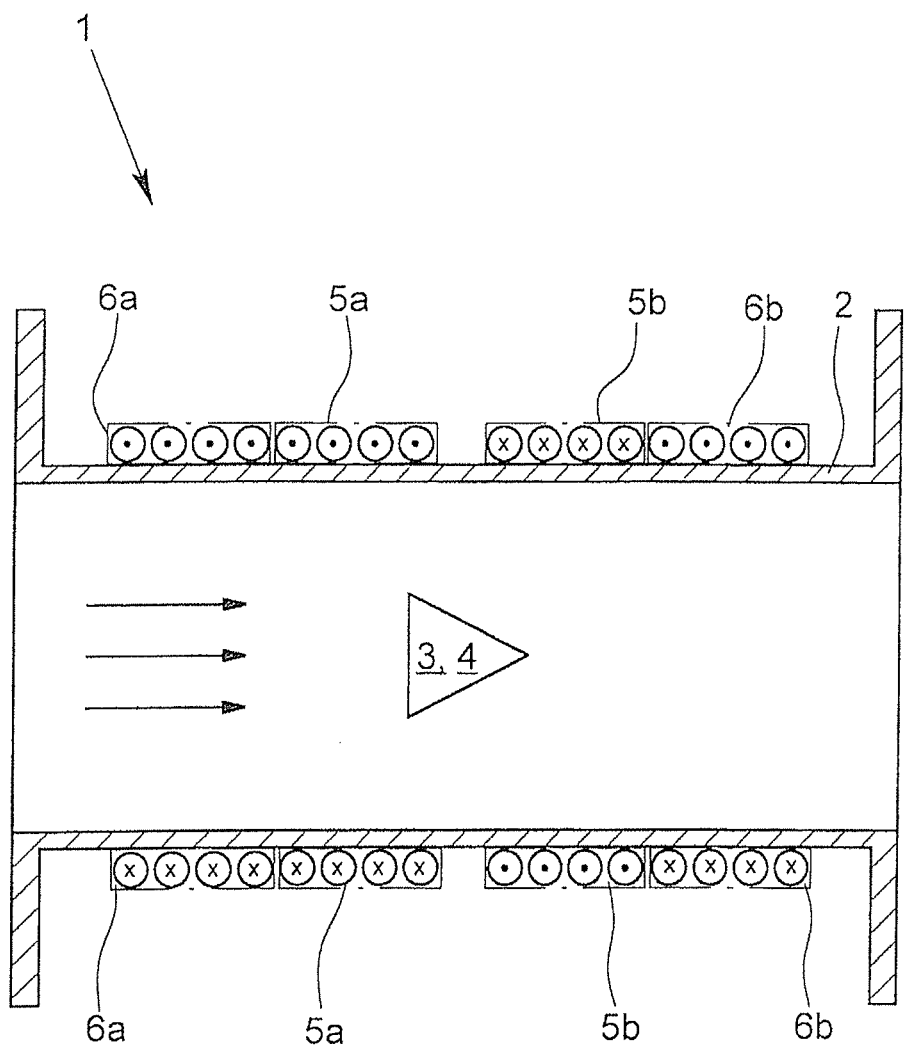
FIG. 5 is schematic sectional representation of another exemplary embodiment of a vortex flow meter according to the invention.
Figure 6:
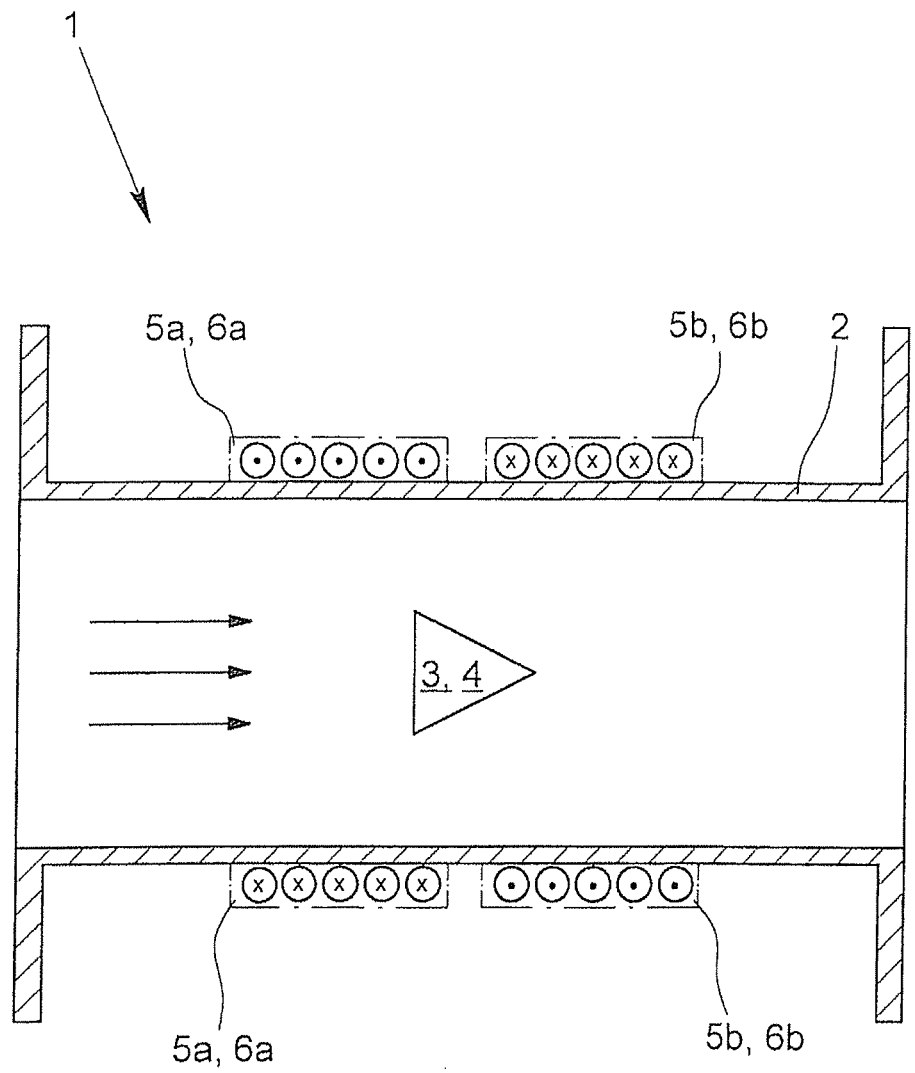
FIG. 6 is schematic sectional representation of a further exemplary embodiment of a vortex flow meter according to the invention.

Sectional representations of various exemplary embodiments of vortex flow meters 1 according to the invention are represented in FIGS. 1, 5 & 6. The vortex flow meters 1 comprise a measurement tube 2 through which a medium can flow, the flow direction being indicated by arrows, and an obstacle 3 respectively provided in the measurement tube 2 in order to generate vortices in the medium. In the exemplary embodiments represented, the obstacle 3 is also a deflection body 4, which consequently lies in the region of action of the obstacle 3. The vortices caused by the obstacle 3, which are not separately represented in the figures, generate pressure variations at their point of origin, so that the deflection body 4 is deflected by the pressure variations associated with the vortices in the medium. The deflection body 4 is configured per se, or is fastened on the measurement tube 2, so that it experiences a deflection owing to the pressure variations in the vortex street. The manner of mounting such deflection bodies is well known, and by itself forms no part of the present invention. Examples of suitable manners for mounting such a deflection body can be found in, e.g., U.S. Pat. Nos. 4,181,020 and 4,005,604; however, any manner of mounting which enables movement can be used.

Outside the measurement tube 2, a magnetic field generating device 5a, 5b is provided with which a magnetic field can be generated in the region of the deflection body 4. The material of the deflection body 4 is selected so that it has a different magnetic permeability from the medium and detectably influences the magnetic field of the medium; examples of suitable materials are ferromagnetic stainless steel and ferromagnetic alloys with at least one of nickel and cobalt. The influence on the magnetic field also changes when the deflection body 4 moves in the medium, this change in the magnetic field being registered by the magnetic field registering device 6 which is, likewise, arranged outside the measurement tube 2. The magnetic field generating device 5 comprises a first excitation coil 5a enclosing the circumference of the measurement tube, and it likewise has a second excitation coil 5b enclosing the circumference of the measurement tube 2 next to the first excitation coil 5a. Both the first excitation coil 5a and the second excitation coil 5b generate a magnetic field oriented in the axial extent of the measurement tube 2 when a current is applied to them; all the exemplary embodiments represented in the figures have this in common.

In the figures, the way in which the first excitation coil 5a and the second excitation coil 5b are connected to a driver circuit for suitable energizing of the excitation coils 5a, 5b is not represented in detail, because this is not crucial for the underlying concept of the invention. What is important in the exemplary embodiments represented, however, is that the measurement tube 2, or the housing of the vortex flow meter 1, does not have to be pierced in order to be able to detect the movement of the deflection body 4; the measurement tube 2 can remain entirely undamaged and no feed-throughs for sensors are necessary.

Figure 2:
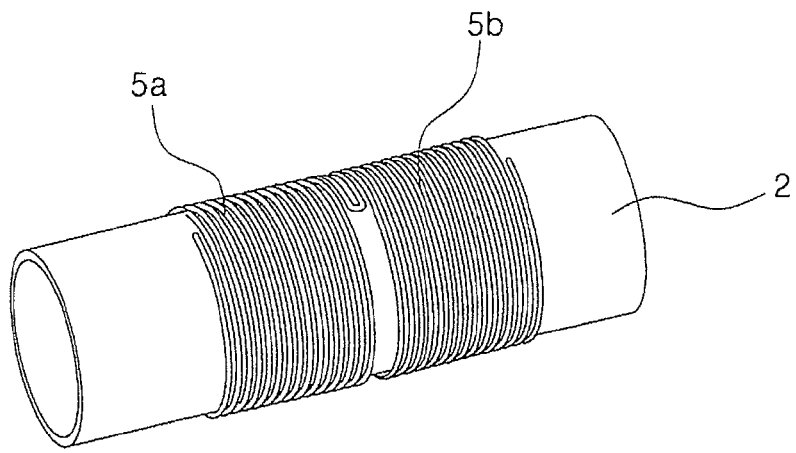
FIG. 2 is a schematic perspective representation of the measurement tube of a vortex flow meter according to the invention with an excitation coil.
Figure 3:
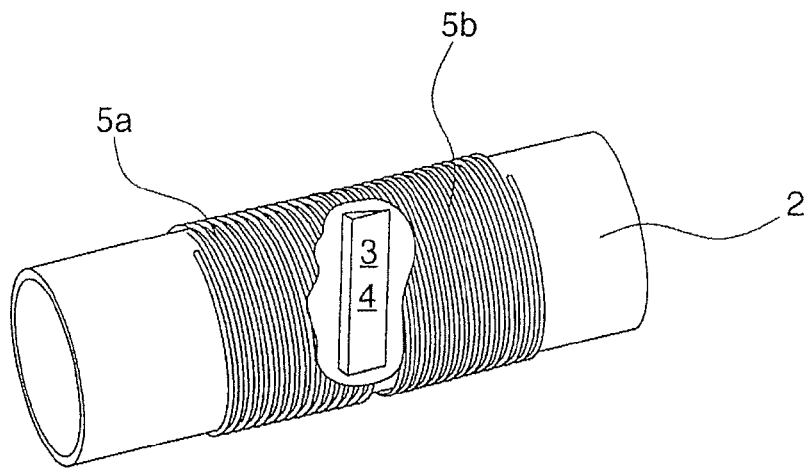
FIG. 3 is a partial sectional view of the measurement tube according to FIG. 2.
Figure 4:
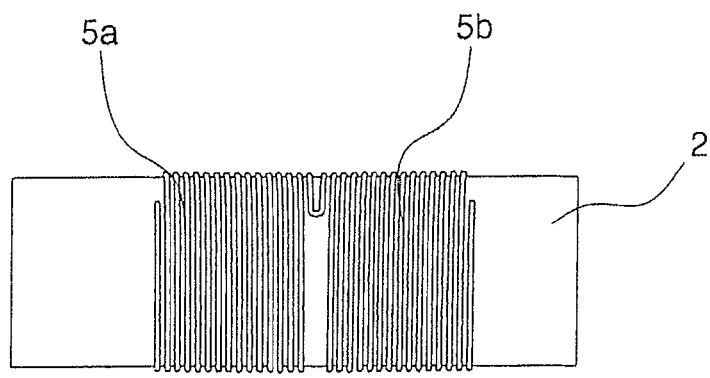
FIG. 4 is a side view of the measurement tube according to FIGS. 2 & 3.

In the exemplary embodiments represented, the first excitation coil 5a and the second excitation coil 5b generate magnetic fields directed oppositely to one another when a current is applied to them, the deflection body 4 being arranged in an essentially field-free region between the first excitation coil 5a and the second excitation coil 5b. As explained in partial perspective representations in FIGS. 2, 3 and 4, the first excitation coil 5a and the second excitation coil 5b are electrically connected to one another, specifically in the region in which they are directly next to one another, in respect of which reference is made to the centrally arranged conductor loop in FIGS. 2 and 4, and they have different winding directions with an equal number of turns. This has the advantage that an identical current can flow through them and, with the adjacent arrangement represented in the figures, they automatically generate an almost field-free space in their connection region owing to the symmetrical arrangement. The individual fields have inhomogeneities in this region, so that when the deflection body 4 is deflected, a magnetic asymmetry is induced which can readily be detected outside the measurement tube 2. The first excitation coil 5a and the second excitation coil 5b connected in this way form a differential coil here.

In the exemplary embodiment according to FIG. 1, the magnetic field registering device 6 comprises a first detector coil 6a, the first detector coil 6a being arranged so that the part of the magnetic field influenced by the deflection body 4 also passes through the first detector coil 6a. If the magnetic field inside the detector coil 6a is modified, or if the magnetic flux inside the detector coil 6a is modified, this change can be registered as an induced voltage at the terminals (not explicitly represented here) of the detector coil 6a. In the exemplary embodiment according to FIG. 1, the first detector coil 6a is arranged concentrically around the first excitation coil 5a and around the second excitation coil 5b, so that magnetic flux changes caused by the deflection body 4 are necessarily registered by the detector coil 6a.

In the exemplary embodiment according to FIG. 5, the magnetic field registering device 6 comprises a further second detector coil 6b, the first detector coil 6a and the second detector coil 6b being arranged coaxially and axially next to the first excitation coil 5a and the second excitation coil 5b; here, the arrangement first detector coil 6a, first excitation coil 5a, second excitation coil 5b and second detector coil 6b is formed as seen from left to right i.e. in the direction of the medium flow indicated. In this way, coils with a uniform diameter can be used.

In the exemplary embodiment according to FIG. 6, the first excitation coil 5a is also the first detector coil 6a and the second excitation coil 5b is also the second detector coil 6b. The first excitation coil 5a and the second excitation coil 5b are here again interconnected in series and a defined current is applied to them by an excitation device (not represented here), i.e., a current of defined form, optionally frequency and amplitude. When the deflection body 4 moves in the magnetic field and when there is a flux change due to this, a voltage is induced in the first excitation coil 5a and the second excitation coil 5b, which therefore likewise act as the first detector coil 6a and the second detector coil 6b. By evaluating the terminal voltage, the movement of the deflection body 4 can readily be deduced. In the present exemplary embodiment, the excitation device applies a sinusoidal current with a constant frequency of 100 kHz to the first excitation coil 5a and the second excitation coil 5b and the induced voltage is measured in the detector coils 6a, 6b. Owing to the large frequency difference between the exciting signal and the registering signal, the vortex frequency can be derived very simply from the induced voltage by suitable filtering.

What is claimed is:

1. Vortex flow meter comprising:
   a measurement tube through which a medium can flow,
   an obstacle provided in said measurement tube for generating vortices in the medium,
   a deflection body provided in a region of action of said obstacle within said measurement tube, said deflection body being deflectable by pressure variations associated with vortices generated by said obstacle in the medium,
   at least one magnetic field generating device arranged outside of said measurement tube for generating a magnetic field in a region of said deflection body, and
   a magnetic field registering device for registering a magnetic field in said region of said deflection body provided outside of said measurement tube,
   wherein said deflection body having a magnetic permeability different from the magnetic permeability of the medium and being influencing said magnetic field,
   wherein said magnetic field generating device comprises a first excitation coil circumferentially surrounding said measurement tube and generating a magnetic field oriented in an axial direction of the measurement tube when a current is applied to it,
   wherein said magnetic field generating device additionally comprises a second excitation coil circumferentially surrounding the measurement tube next to the first excitation coil and generating a magnetic field oriented in an axial direction of the measurement tube when a current is applied to it, wherein said first excitation coil and said second excitation coil generate magnetic fields directed opposite to one another when a current is applied to them, and wherein said deflection body is arranged in a field-free region between said first excitation coil and said second excitation coil.

2. Vortex flow meter according to claim 1, wherein said first excitation coil and said second excitation coil are electrically connected to one another and have different winding directions, and wherein said first excitation coil and said second excitation coil have an equal number of turns.

3. Vortex flow meter comprising:
a measurement tube through which a medium can flow,
an obstacle provided in said measurement tube for generating vortices in the medium,
a deflection body provided in a region of action of said obstacle within said measurement tube, said deflection body being deflectable by pressure variations associated with vortices generated by said obstacle in the medium, and
at least one magnetic field generating device arranged outside of said measurement tube for generating a magnetic field in a region of said deflection body,
a magnetic field registering device for registering a magnetic field in said region of said deflection body provided outside of said measurement tube,
wherein said deflection body having a magnetic permeability different from the magnetic permeability of the medium and being influencing said magnetic field,
wherein said magnetic field generating device comprises at least a first excitation coil circumferentially surrounding said measurement tube and generating a magnetic field when a current is applied to it, and at least a first detector coil for registering the magnetic field, said first detector coil being arranged so that a part of said magnetic field influenced by said deflection body passes at least partially through said first detector coil, and
wherein said first excitation coil is arranged in said first detector coil.

\* \* \* \* \*